United States Patent Office 3,011,178
Patented Dec. 5, 1961

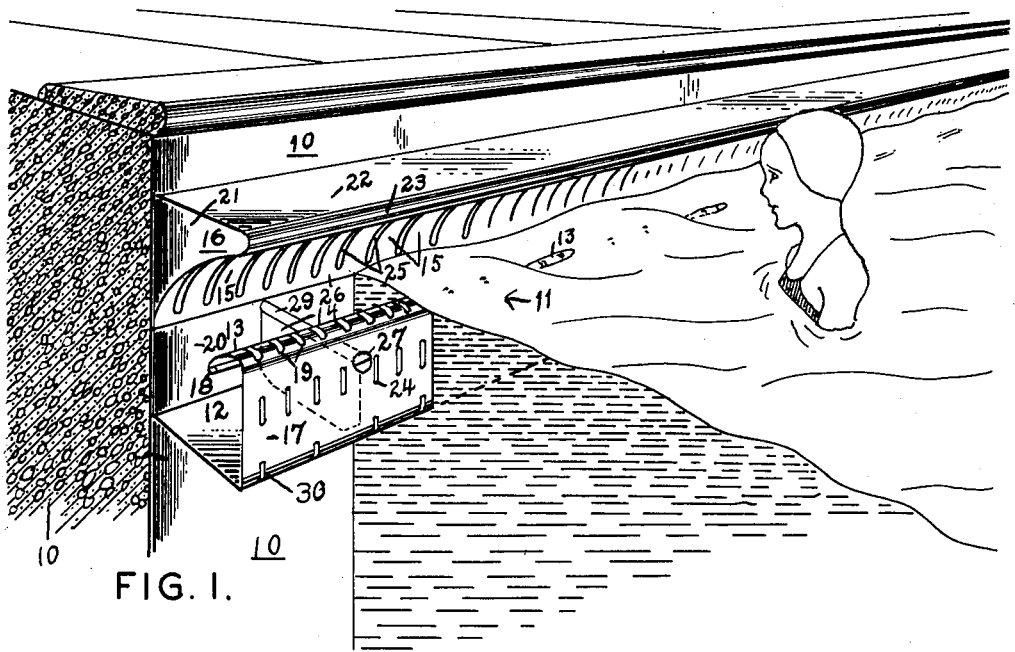
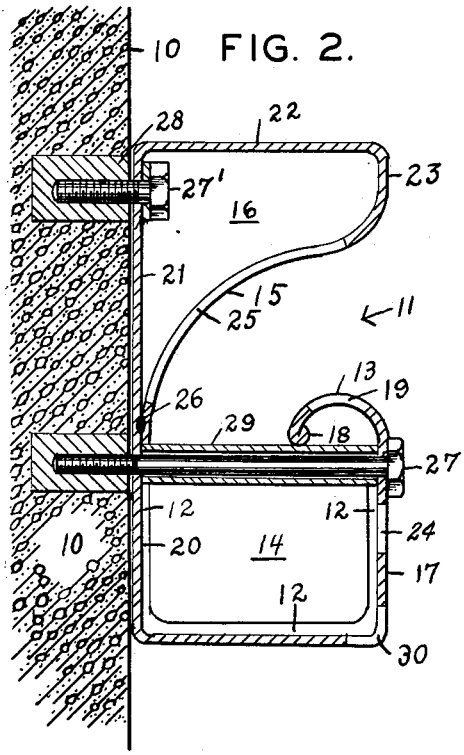
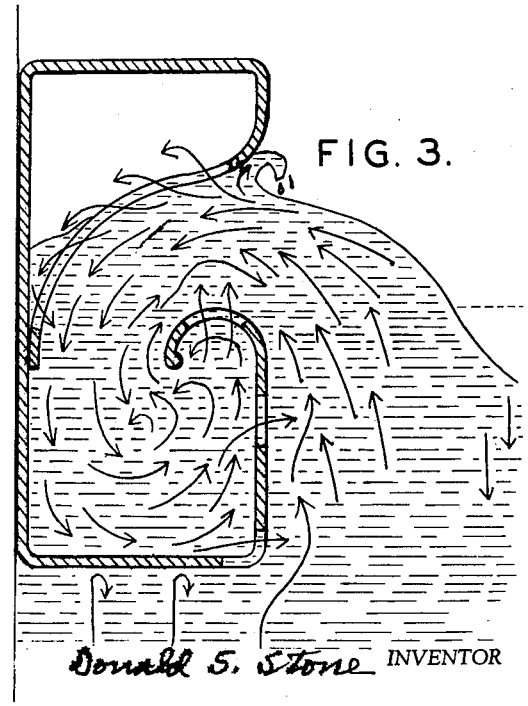

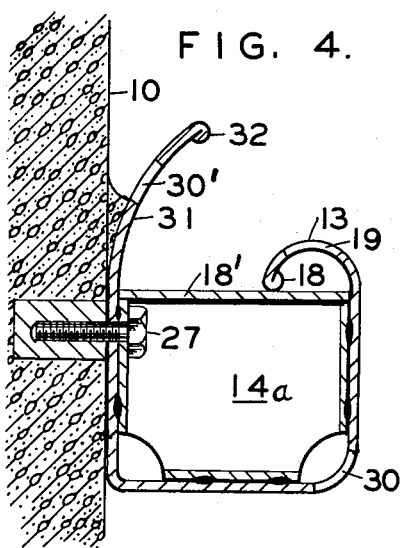
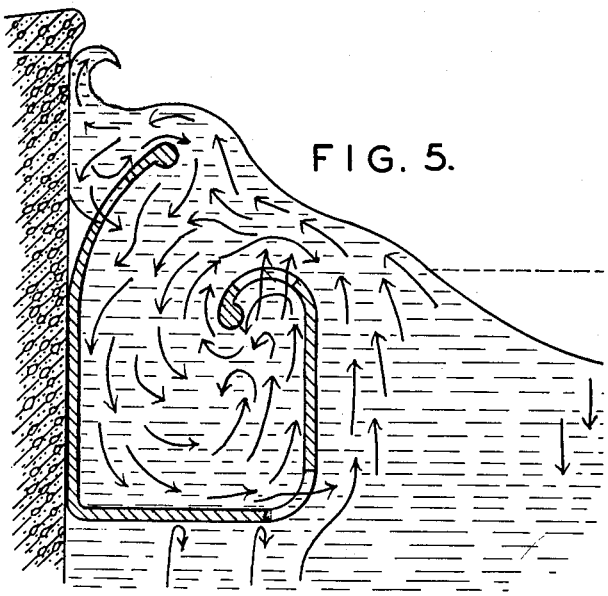
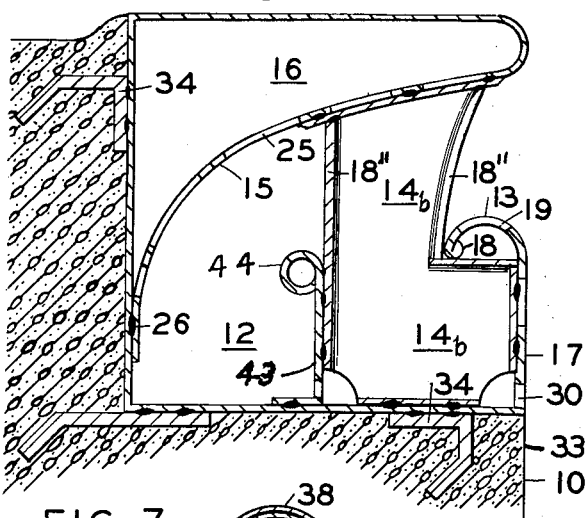
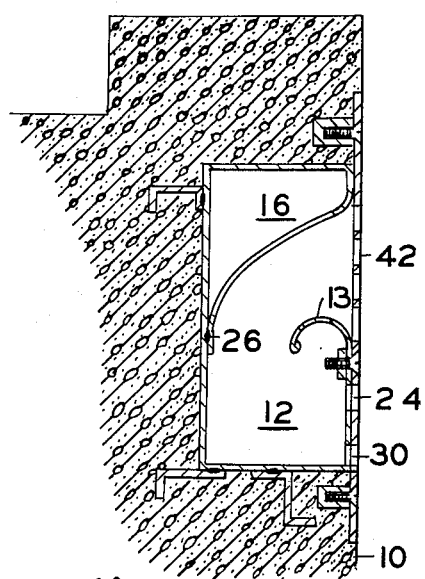
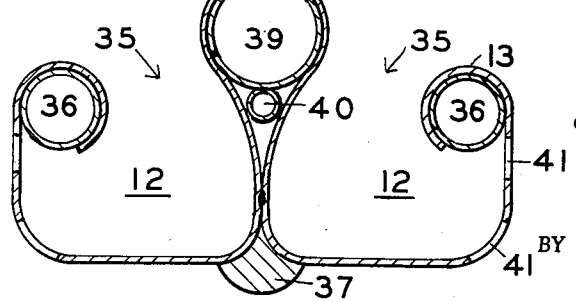

3,011,178
WAVE TRAP
Donald S. Stone, Largo, Fla.
(303 Fairfax Drive, Pensacola, Fla.)
Filed May 7, 1959, Ser. No. 811,689
8 Claims. (Cl. 4—172)

This invention relates to means for neutralizing liquid waves in such a way that their force is largely absorbed and their backwash reduced. More particularly, the invention comprises a trap for liquid waves. While the invention is primarily designed for use in swimming pools where excessive surface turbulence (waves) interferes with the safety, pleasure, and movements of the swimmers, the invention is of general application and may be used wherever it is desired to reduce the surface turbulence of liquids.

In the usual gutterless home swimming pools, waves created by persons swimming and diving, travel toward the walls of the pool where they are reflected substantially undiminished in the same general manner that light is reflected. Other waves, similarly created before the dissipation of the first waves, tend to build up and multiply the surface turbulence, rendering swimming unpleasant for many, and even dangerous for some participants.

The advantages of placid water for small children and beginners of all ages, are manifest. Even for most swimmers, excessive surface turbulence is objectionable. Surface turbulence makes the swimmer hold his head higher to be sure of getting a breath. The head position sinks the feet so that the swimmer is swimming "uphill." This requires more effort and tires the swimmer. The waves make breathing difficult and frequently cause one to get water in the nose or mouth which is unpleasant and may result in an infection. Competitive swimming pools are judged "fast" or "slow" depending upon how quickly the pool can reduce waves produced by the swimmers.

In the past, waves have been reduced by pouring oil on the surface, introducing air into the water, or by setting up some kind of an obstruction, such as hanging heavy chains in the water, or building a breakwater. These expedients are not feasible for use in swimming pools.

One attempt to reduce wave action in swimming pools was the "flush deck" swimming pool, where the water was allowed to slosh onto the apron much in the manner that waves are dissipated on a receding shoreline. Swimmers could not see the edge of the pool, however, and were always swimming into it and bruising themselves. It also created a messy situation around the deck of the pool.

There is some incidental wave dissipation in those pools which have a drain gutter formed as part of its inner wall and disposed with its edge at the desired water level to be maintained. Even under most favorable conditions, however, gutters are only partially efficient as wave dissipators. Also, the water level is seldom held at the exact level that would be required to make the gutters at all effective in reducing waves.

With the foregoing in mind, it is the principal object of the present invention to provide a wave trap structure for the purpose aforementioned which can be incorporated in the wall of a swimming pool during its construction, or be readily attached to the wall of an existing pool.

It is a further object of this invention to provide a wave trap which is also adapted for installation on shore as a breakwater, to reduce backwash and to prevent erosion, as well as to cut down harmful spray.

It is a still further object of this invention to provide a wave trap which is adapted to be used to establish a quiescent area in an open body of water; as well as to serve as a combined wave trap and lane line marker for competitive swimming events.

It is another object of this invention to provide apparatus for neutralizing waves wherein the backwash is effectively eliminated.

Another important object of this invention is to provide a wave dissipating structure of the kind mentioned wherein the wave reaching the structure is received, the wave force neutralized, and the water returned relatively slowly by the structure directly to the main body of water.

Yet another object of this invention is to provide a structure of the nature abovementioned which is highly practical and can be marketed at a price within the financial reach of the average pool owner and operator.

Yet another object is to provide a wave neutralizing structure which will make swimming in pools safer, as well as more beneficial and enjoyable to participants.

These and other objects and advantages of this invention will become apparent as the following description proceeds. The invention will be best understood from a consideration of the following detailed description, taken in connection with the accompanying drawings forming part of the specification, with the understanding, however, that the invention is not confined to any strict conformity with the showing of the drawings and may be changed and modified so long as such changes or modifications mark no material departure from the salient features of the invention as expressed in the appended claims.

In the drawings:

FIGURE 1 is a perspective view of a portion of a preferred form of my invention, shown as applied to the wall of a swimming pool, part of said wall being shown in cross-section;

FIGURE 2 is a cross-section of the wave trap structure of FIGURE 1;

FIGURE 3 is a diagram showing by arrows how the wave trap of FIGURES 1 and 2 functions;

FIGURE 4 is a cross-section of a modified form of my invention;

FIGURE 5 is a schematic view showing by arrows the course of fluid flow in the form of the invention of FIGURE 4;

FIGURE 6 is a cross-section of another modification of the invention;

FIGURE 7 is a cross-section view of still another modification of the invention, as a flotation device to be used as a combined wave trap and lane marker, life line, or boundary marker; and FIGURE 8 is a cross-section showing how the wave trap of this invention may be recessed into the wall in constructing a new pool, as well as a preferred mode of screening the trap.

Referring, now more particularly to the drawings, wherein similar reference numerals refer to similar parts throughout the several views, and specifically to FIGURES 1 and 2, reference character 10 designates a wall of a swimming pool, near the water level of which is mounted my improved wave trap 11.

In general, my wave trap is illustrated as a structure formed from sheet metal and includes a trough portion or turbulating chamber 12 having a tripping lip 13, spaced baffles 14 in the trough, and a deflector and/or diffusing wall 15 disposed above the trough for directing the incoming wave into the trough, the deflector in one form of the invention serving as one wall of a diffusing chamber 16.

The trough portion 12 defines what may be called a turbulating chamber, the outer wall 17 of which is turned in above the trough to form the arcuate tripping lip 13 for the waves. The turbulating chamber receives the downward thrust of the water, as will more fully appear hereinafter, and turns it back upon itself so that it is largely neutralized by its own force. It will be noted that the free edge of the lip is formed with a bead 18 to add rigidity and also to protect children from cutting their hands on the lip should their curiosity lead them to put their hands into the trap. The trap should be supported so that the top of the arcuate lip will be flush with the surface of the water.

Trough 12 is provided with small openings 30 in its lower portion to permit drainage when the pool is emptied. The arcuate tripping lip 13 is formed with a plurality of jet openings, illustrated in the form of slots 19, which utilize the impetus of the water deflected into the turbulating chamber to eject small jets of water upward through the arcuate tripping lip to aid in damping the instant wave, and retard its return flow. Where it is necessary to handle a large volume of water, jet slots 24 may be provided in the outer wall 17 also, but this is usually not necessary in traps designed for small swimming pools.

Illustrated as integral with the rear wall 20 of the trough is the rear wall 21 of a generally triangular combined diffuser chamber and deflector structure 16. In view of the likelihood of swimmers sitting on the trap I prefer to form continuous vertical ribs bridging both rear walls 20, 21 to add strength and rigidity thereto. The diffuser chamber structure includes a top wall 22 extending forwardly from the rear wall. The outer end of the top wall is bowed downwardly at 23, then bowed at 15 toward the rear wall 21 to define the deflector. The free end of the deflector is spot welded, riveted or otherwise secured at 26 to rear wall 21. To prevent accidents, the top wall of the diffuser chamber, particularly when it is arranged flush with the deck of the pool, should be coated with a skid-proof covering, or texturized to present a rough, or non-slippery surface. The bowed surface of the deflector 15 is formed with a plurality of spoiler slots 25, or other equivalent fluid dispersing means, such as holes, louvres, or vanes. The latter should be sufficiently small to prevent small children from getting their fingers caught in them. It will be apparent that part of a wave breaking over lip 13 will impinge against the deflector and be directed by it down into the turbulating trough, and part of the wave will gush through said slots up into the diffuser chamber, where its return will be momentarily delayed.

The wave trap of this invention may be attached to an existing wall of a pool in many ways, and I have illustrated as a satisfactory mounting the use of headed bolts 27 passing through the trough 12 with the threaded end of the bolts received in tapped plugs 28 provisionally fixed in the wall of the pool. Tubular spacers 29 may be sleeved upon the intermediate portion of the bolts for maintaining the side walls of the trough apart. Where there is likelihood of swimmers sitting or standing on the trap, additional fastening and supporting means, illustrated as bolts 27', may be supplied for the diffusion chamber portion of the structure.

A plurality of baffle plates 14 are arranged along trough 12 for swinging adjustment about their upper edges to limit, direct, or otherwise control the flow of liquid along the trap. In practice, a clearance is provided between the edges of the baffle plates and the trough, and I roll the upper edges of the baffles to form the tubular spacers 29 through which the anchoring bolts pass. In this way the baffles may be pivotally adjusted by loosening the bolts, swinging the baffles to the angle desired, and then retightening the bolts.

The operation of the wave trap will be generally apparent from the functional diagram of liquid flow in FIGURE 3. Water in waves normally moves mostly up and down until the wave breaks, and then it takes on a forward motion. In this instance the arcuate tripping lip 13 initiates the tripping action which sends the water into forward motion. The water being impelled into the trap strikes the inclined slotted deflector wall. Part of the water gushes through the spoiler slots into the diffusion chamber where it is momentarily held. Most of the water, however, is deflected downward into the turbulating chamber which is already filled with water. The inertia of the water in the turbulating chamber absorbs a good bit of the force, and the rest of the force is expended in a circulating movement which turns the wave back upon itself. This same pressure transmitted through the incompressible water causes small jet streams to be expelled upward through the small jet holes 19 in the arcuate tripping lip. This helps to break up the water coming into the trap, and also breaks up the flow of water back out of the trap.

Since it is contemplated that the trap structure will be of considerable length, it is preferable to make the trap of a number of identical units or sections, one end of each section being designed for ready joining with the end of an adjacent section. The several sections may be of any convenient length, and also curved as needed to fit curvilinear pools. While partial results may be obtained by applying the wave trap to only a portion of the pool wall, maximum wave reduction will be achieved by encircling the entire inner wall waterline. It should be understood that where the sections are applied to only a portion of the pool, the ends of the outermost sections should be closed off.

It should also be understood that the dimensions of the wave trap may be varied in accordance with the need. As a working rule the height of the trap should equal the height of the wave it is required to neutralize. In a 20'x60' pool, a trap 5 inches wide and 10 inches high would be correct. In a 20'x40' pool, the size most used in home pools, a 4"x8" trap would be adequate. A trap to reduce ocean waves would be correspondingly larger.

The wave trap can be made of any suitable material depending upon the composition of the water, the wave forces it is designed to encounter, and the human abuse to which it may be subjected. Aluminum or stainless steel is quite satisfactory for most conditions, but plated metals, or even plastics may be used.

It is obvious that the fabrication may vary depending upon the materials used and the size and strength of trap desired. It is contemplated that manufacturing technique may dictate that the trough portion 12 and diffuser chamber portion 16 be made separately and independently mounted in assembled order to complete the trap. For situations demanding extreme ruggedness of the trap, it may be formed as a casting.

FIGURES 4 and 5 depict a first modification of the trap per se to provide what may be called an economy model. Here the trough and tripping lip are the same as in the first form of the invention. The main differences from the first form of the invention resides in a simplification of the deflector wall and the use of fixed baffles 14a. In place of the diffuser chamber 16 and its inclined slitted front wall (FIGURES 1 and 2), the back wall is here simply curved forwardly at 31. The upper end of the wall 31 is beaded at 32 to eliminate sharp edges. The deflector may be ribbed or otherwise reinforced, and has only sufficient openings 30' to permit stray water sloshing over the said wall to escape. In this form of the invention the baffle plates 14 are vertically disposed and snugly fit into the trough, the edge portions of the baffles being welded at a plurality of spaced points to the inner bottom and side walls of the trough. In FIGURE 4 the side and bottom edges of baffle 14 are illustrated partially in section to show the spot welding of the baffles to the trough. The upper edge of baffles 14 are rolled to provide a protective and reinforcing bead 18'. The principle of operation of this form of the invention will be apparent from the arrows in FIGURE 5.

The form of the invention of FIGURES 4 and 5 is particularly designed for small pools and can be permanently bolted in place on the wall of a pool, after the manner suggested for the first form of the invention. This form of the invention lends itself for temporary use as an adjunct to a permanent gutter. It can also be installed by set screws, clamps, or any other suitable means.

FIGURE 6 depicts a modification of my invention employing multiple troughs to provide maximum trappage. Here the trap is made sufficiently wide to provide room for two troughs 12 in place of the usual one. In this modification the outer wall 17, lip 13, apertures 24 and 30 are substantially identical with the structure of FIGURES 1 and 2. The inner trough 12 is defined by an elongated partition plate 43 having an angular ledge at its bottom, which ledge is spot welded to the lower wall of the trough. The upper edge of plate 43 is rolled inwardly to provide a bead 44. In this form of the invention I prefer to employ the inner trough as a simple gutter, for connection with the drainage or filtration system of the pool. Therefore the baffles are omitted from the inner trough 12. The baffles 14b of the outer trough are spot welded to the trough, as shown, and the baffles extend upwardly to and are spot welded, or otherwise fixed to the underside of plate 15, thus supporting and bracing the latter. Both the front and rear edges of the portions of baffles 14 above the trough are rolled to provide beads 18" to obviate sharp edges on which swimmers may possibly cut themselves. The edge portion under lip 13 is likewise beaded, for the same purpose.

It is apparent that the operation of this form of the invention corresponds generally to the apparatus of FIGURES 1 and 2, save for the gutter 12. Thus a wave breaking over lip 13 will impinge upon diffuser wall 15 and be directed downwardly. The front trough will receive the brunt of the wave and handle it as described for FIGURES 1 and 2; the excess water sloshing into the gutter trough 12 and being drained away. This trap operates much more efficiently than the other models and is designed more particularly for installation in large public pools having larger waves and calling for maximum trappage. This form of the invention is illustrated as resting upon a ledge 33 formed during construction of the pool. It is anchored in place by straps 34 extending from the trap and embedded in the pool wall.

FIGURE 7 shows a cross section of still another modification comprising a floating wave trap for use as a lane line wave trap and marker for competitive swimming, a swimming area marker and wave trap, or as a life line. A suitable form of the invention for this purpose includes, in brief, two traps 35 generally corresponding to the basic design shown in FIGURE 4, secured together, back to back. In this form of the invention it is preferable to make the trap sections of a length of only one or two feet each, and link them together by a cable or equivalent linkage. Under the arch of each lip 13 is a tube 36, each with its ends sealed to provide air chambers to float the structure. Centrally of the bottom, weight 37 is attached to ballast the structure to proper depth and lend greater inertia. The bowed deflector walls are not sloted as in the first described form of the invention, but serve merely to deflect the wave into the trough. The upper edges of the deflector walls are joined by an arcuate portion 38 and enclose a closed end tube defining air chamber 39. A small tube 40 extends through each unit for passage of a cable therethrough, for tautly stringing a series of the units thereon. The outer walls of each trough are provided with pressure equalization holes 41.

The forms of my invention shown in FIGURES 1-6 are depicted as attached to the side wall of a pool, or secured to a ledge formed in the wall of the pool during its construction. In FIGURE 8 I have illustrated the first form of my invention as mounted within the confines of a recess formed in the pool with the front of the trap substantially flush with the wall of the pool. Under certain circumstances in order to meet competitive swimming regulations, it is desirable to conceal the trap behind a grid or screen 42. This does not change the action of the basic principles, but merely enables the wave trap to be used and still conform to the swimming rules which require an unbroken surface at each end of the pool for turning purposes.

Having thus described my invention it is obvious that various modifications in addition to those above described may be made without departing from the spirit of the invention; and, therefore, I do not wish to be understood as limiting myself to the exact forms, constructions and arrangements and combinations of parts herein shown and described, save as limited by the appended claims.

I claim:

1. Apparatus for dissipating waves impinging thereon, comprising a horizontal turbulating trough, the edge of one side wall of said trough carrying a tripping lip of generally arcuate cross-section overlying a substantial portion of said trough, a diffuser chamber of generally triangular cross-section supported above and overlying said trough with one wall thereof inclined to the trough to deflect the waves thereinto, said inclined wall being formed with a plurality of spaced apertures whereby part of a wave may enter and be checked in said chamber.

2. The apparatus as defined in claim 1 wherein said lip is formed with a plurality of upwardly directed jet apertures, for the purpose described.

3. A combined line marker and wave trap structure formed of a plurality of sections, each section comprising two trap units secured together back to back, each unit including a turbulating trough having one wall thereof abutting and secured to the corresponding wall of the other unit, the edge of the outer wall of each unit being rolled into a lip, and a buoyant member held beneath each lip, the abutting walls of said units merging into outwardly inclined wave deflector members, ballast means secured to the bottom of the troughs at the juncture thereof, and a tube fixed to and extending through said structure between said deflector members, for reception of a rope or the like for tautly stringing a plurality of said sections together.

4. Apparatus for dissipating waves comprising means defining a plurality of horizontal troughs each of generally U-shape in cross-section and held together in side by side relation, means for mounting said troughs to extend horizontally lengthwise the wall of a pool at substantially the water line thereof, the edge of the outer wall of the outer trough being provided with a tripping lip, a generally triangular diffuser chamber mounted above said troughs with one wall thereof inclined toward the inner trough, said wall being formed with a plurality of openings, baffles fixed within the outer trough and extending upwardly and fixed to said inclined wall for supporting said chamber, the inner trough serving as a gutter for the pool.

5. Apparatus for dissipating waves of a body of water comprising a turbulating trough having a tripping means extending along the edge of one wall thereof, said tripping means including a rounded surface extending inwardly over a substantial portion of the trough, and float means extending along and secured to said trough for sustaining the trough with said tripping means substantially at the surface of said body of water.

6. Apparatus for dissipating waves of a body of water, comprising a trough, a tripping lip extending along the edge of one side wall of said trough, said lip including an upwardly inclined portion projecting over a substantial portion of said trough, means for mounting said trough with said one wall disposed toward the area of incoming waves and with said lip substantially at the level of said body of water, spaced baffle plates arranged in and transversely of said trough for restricting flow therealong, the upper edge of each plate including loop means, said mounting means including bolt devices, one passing through the loop means of each plate for clampingly securing said plates for pivotal adjustment in relation to said trough.

7. Apparatus for dissipating waves of a body of water impinging thereon and returning the entire content of same directly to said body at substantially the point of impingement, consisting of a horizontal turbulating trough of generally U-shape in cross-section, said trough being devoid of drain connections, a tripping lip extending along the edge of one side wall of said trough, said lip comprising a portion extending from said one side wall and bowed inwardly toward the opposite side wall of the trough and overlying on the order of a third of the channel between said walls, and means sustaining said trough with said one side wall and lip disposed toward the area of incoming waves and the crown of said lip at the level of said body of water, with the trough submerged in said body of water and constantly filled.

8. Apparatus for dissipating waves of a body of water impinging thereon and returning the entire content of same directly to said body at substantially the point of impingement, consisting of a horizontal turbulation trough devoid of drain connections, the edge portion of one wall of said trough having a portion bowed toward the opposite wall of the trough to provide an arcuate tripping lip overlying on the order of one-third the channel of the trough, an inclined deflector member projecting from said opposite wall at a point substantially even with the edge of said one wall outwardly over said trough for deflecting waves impinging thereon into said trough, the crown portion of said lip being formed with spaced upwardly directed jet openings for ejection of streams crosswise the impinging waves.

References Cited in the file of this patent

UNITED STATES PATENTS

| | | | |
|---|---|---|---|
| 1,091,798 | Booraem et al. | Mar. 31, | 1914 |
| 1,461,026 | Booraem | July 10, | 1923 |
| 1,585,736 | Rohmer | May 25, | 1926 |
| 1,657,598 | Whitman | Jan. 31, | 1928 |
| 1,701,842 | Fisch | Feb. 12, | 1929 |
| 1,855,258 | Sirch | Apr. 26, | 1932 |
| 1,959,555 | Taylor | May 22, | 1934 |
| 2,056,855 | Herz | Oct. 6, | 1936 |